United States Patent [19]

Obata

[11] Patent Number: 5,317,599
[45] Date of Patent: May 31, 1994

[54] METHOD AND CIRCUIT FOR DETECTING CN RATIO OF QPSK SIGNAL

[75] Inventor: Tomoji Obata, Tokyo, Japan
[73] Assignee: NEC Corporation, Japan
[21] Appl. No.: 985,637
[22] Filed: Dec. 3, 1992

[30] Foreign Application Priority Data

Jan. 14, 1992 [JP] Japan .................................. 4-004385

[51] Int. Cl.$^5$ ...................... H04N 5/445; H04L 27/10
[52] U.S. Cl. ......................................... 375/86; 375/10;
375/114; 329/304
[58] Field of Search ..................... 375/10, 52, 53, 54,
375/83, 85, 86, 114; 329/304; 328/162, 166

[56] References Cited

U.S. PATENT DOCUMENTS

| | | | |
|---|---|---|---|
| 4,688,234 | 8/1987 | Robinton | 375/10 |
| 4,773,083 | 9/1988 | Baumbach et al. | 328/166 |
| 4,920,543 | 4/1990 | Martin | 375/10 |
| 5,166,954 | 11/1992 | Grizmala et al. | 328/162 |

*Primary Examiner*—Stephen Chin
*Assistant Examiner*—Young Tse
*Attorney, Agent, or Firm*—Laff, Whitesel, Conte & Saret

[57] ABSTRACT

The invention is a method and a circuit for detecting the carrier-to-noise ("CN") ratio of a quaternary phase-shift keying ("QPSK") signal. A binary signal including in the QPSK signal is reproduced by a converting circuit including a QPSK demodulator and a difference converter. The binary signal is then error-controlled by an error detecting circuit and the detection of a double-error. The occurrence number of the double-error is counted during a predetermined time period which is long enough to compare with the occurrence time when two successive double-errors occur. A microcomputer stores a conversion table corresponding to the theoretical relation between the CN ratio and the occurrence number. The microcomputer computes the CN ratio from the detected occurrence number. The theoretical relation is formulated based on the assumption that noise distributes isotopically around the QPSK signal in the signal space in accordance with the nomal distribution.

8 Claims, 4 Drawing Sheets

METHOD AND CIRCUIT FOR DETECTING CN RATIO OF QPSK SIGNAL

BACKGROUND OF THE INVENTION

1. Field of the Invention

The present invention relates to a method and a circuit for detecting a carrier-to-noise ratio (CN ratio), and more particularly to a CN ratio detecting circuit used for adjusting a satellite broadcast receiver at an installation of an antenna and also for checking receiving conditions of satellite broadcast signals.

2. Description of the Related Art

FIG. 1 shows a block diagram of a prior art CN detecting circuit for a satellite broadcast signal. In the figure, variable resistor 1 is directed to adjusting the input level of a frequency-demodulated signal FD of a received satellite broadcast signal. Wide-band amplifier 2 has a pass-band width wider than 10 MHz. The noise component included in the output of wide-band amplifier 2 passes through band-pass filter (BPF) 15 with a center frequency of approximately 9 MHz, and is amplified by noise amplifier 16. The gain of noise amplifier 16 is adjusted in advance with variable resistor 17 so that the value of the CN ratio to be determined has a predetermined relation to a detected noise level. The output level of noise amplifier 16 is next detected through smoothing or averaging by noise detector 18, and then converted to a digital noise signal by analog-to-digital (A–D) converter 19. A–D converter 19 is typically a 4 bit converter capable of representing the converted digital signal in 16 steps. Microcomputer 20 calculates the CN ratio in accordance with a predetermined program from the digital noise signal and delivers the calculated result to a given display device.

Wide-band amplifier 2 also provides an output OF, to be delivered to a transmission line. The output of wide-band amplifier 2 is converted so that the output impedance matches with the 75 Ω characteristic impedance of the transmission line by means of impedance converting circuit 21 which transmits the impedance-matched output to the transmission line as the frequency-demodulated output OF.

The problem encountered in the CN ratio detecting circuit described above is that, because of dispersions in the gain and of the signal-to-noise ratio of both the noise amplifier and the noise detector, and also because of errors caused by temperature variations and non-linear distortions in the circuit characteristics, it is difficult to adjust the gain of the noise amplifier so as to cause the detected noise level to have a predetermined correlation with the CN ratio of the frequency-demodulated signal. This involves a difficulty in obtaining a precise CN ratio through analog processing of the received signal, which results in a difficulty in adjusting and checking the satellite broadcast receiving system.

Another problem encountered is that using expensive parts such as an A–D converter, in the analog CN-ratio detecting circuit brings about an increase in the cost of the circuit.

SUMMARY OF THE INVENTION

It is an object of the present invention to provide a method of detecting the CN ratio of a QPSK signal, which is less influenced by dispersions in gains and signal-to-noise ratios of the circuit elements and by temperature variations and non-linear distortions in the circuit characteristics.

It is another object of the present invention to provide a circuit for detecting the CN ratio of a QPSK signal, which is less expensive and less influenced by dispersions in gains and signal-to-noise ratios of the circuit elements and by temperature variations and non-linear distortions in the circuit characteristics.

In order to attain the first object above, the method according to the present invention is directed to determining the CN ratio of a QPSK signal which carries or includes a binary signal representing at least a message and an information for error-control to detect a double-error. The method comprises the steps of:

receiving the QPSK signal and reproducing the binary signal from the QPSK signal, detecting the double-error included in the binary signal and generating a pulse whenever the double-error is detected, counting the pulse and providing an occurrence number of the double-error during a predetermined time period which is long enough to compare the occurrence number with an average occurrence time during which successive double-errors occur, and computing the CN ratio from the occurrence number in accordance with the theoretical relation between CN ratios and occurrence numbers of the double-errors.

The theoretical relation is expressed by the equation $$M = k\Phi(-\alpha^{-\frac{1}{2}}),$$

where: α and M denote the CN ratio and the occurrence number of the double-error, respectively, k being a proportional constant, and the function Φ being defined so that $$\Phi(Z) = (2\pi)^{-\frac{1}{2}} \int_{-\infty}^{Z} \exp(-\xi^2/2)\, d\xi.$$

where: ζ denotes a variable integration having a dimension of $\alpha^{-\frac{1}{2}}$.

In order to attain the second object above, the circuit according to the present invention is directed to determining the CN ratio of a QPSK signal which includes a binary signal representing at least a message and an information for error-control to detect a double-error. The circuit comprises:

converter means which receives said QPSK signal and reproduces said binary signal from said QPSK signal, error-control means which at least detects said double-error included in said binary signal, and delivers a pulse whenever said double-error is detected, counter means which counts said pulse and provides an occurrence number of said double-error for a predetermined time period which is long enough to compare with an average occurrence time during which successive doubleerrors occur, and computer means which computes the CN ratio from the occurrence number in accordance with the theoretical relation between CN ratios and occurrence numbers of the double-errors, as described above.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

Figure 1:
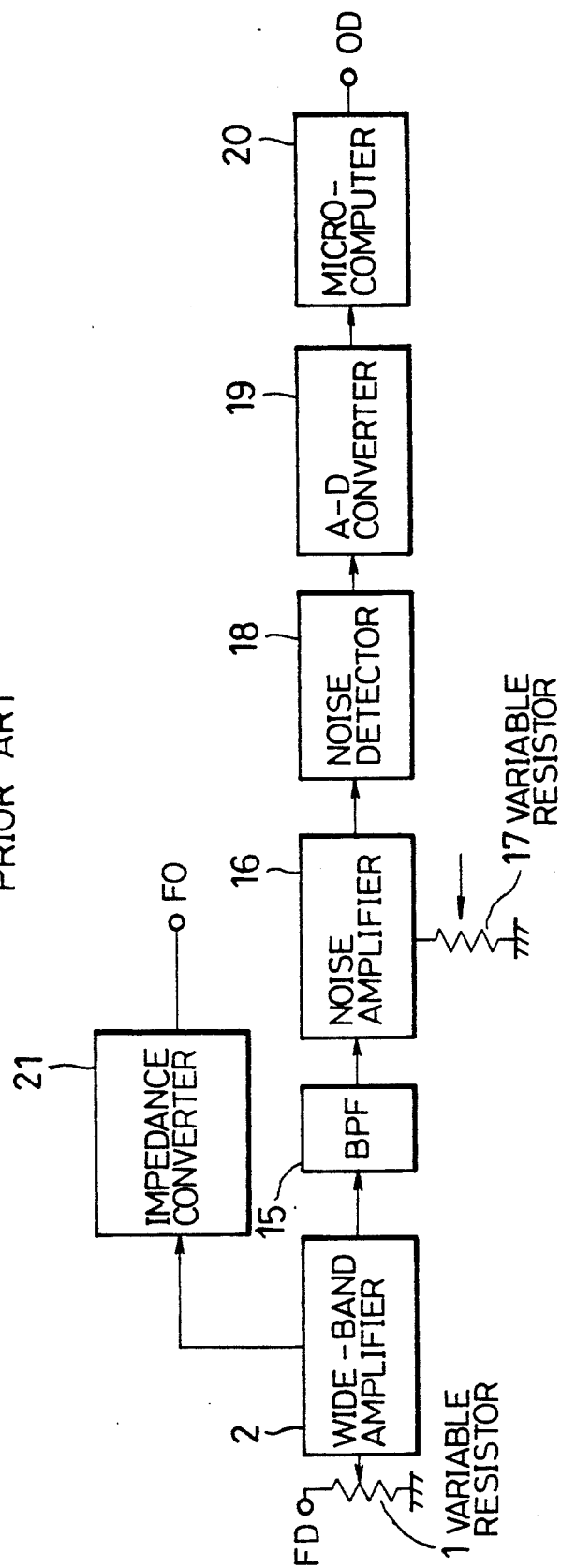
FIG. 1 shows a block diagram of a prior art CN-ratio detecting circuit for a satellite broadcast signal.

Referring to the drawings, the embodiment of the present invention will be presented below.

Figure 2:
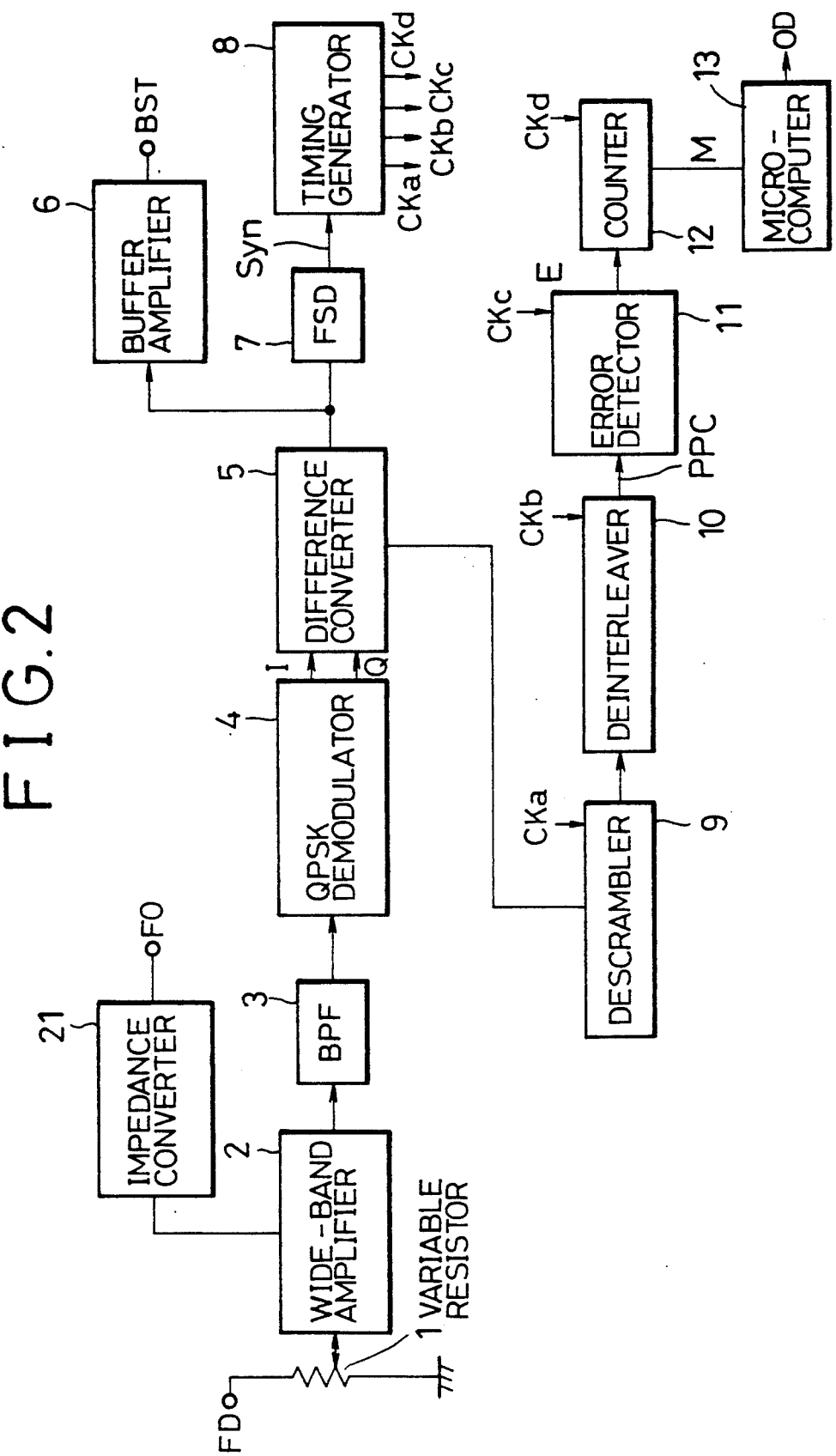
FIG. 2 shows a block diagram illustrating an embodiment of the CN-ratio detecting circuit according to the present invention.

FIG. 2 is a block diagram illustrating an embodiment of the CN-ratio detecting circuit according to the present invention. In the figure, variable resistor 1, wide-band amplifier 2 and impedance converter 21 are identical with those illustrated with reference to FIG. 1. Band pass filter (BPF) 3 with a pass-band width of 5.7272 MHz is adapted for passing a QPSK voice sub-carrier. QPSK demodulator 4 synchronous-demodulates the QPSK voice subcarrier to provide coherent component signal I and othogonal component signal Q. Difference converter 5 regenerates a PCM signal, including a voice PCM signal, from two component signals I, Q. Buffer amplifier 6, fed with the PCM signal from difference converter 5, delivers the PCM signal as a bit stream BST. Frame-synchronization detector (FSD) 7 is supplied with the PCM signal from difference converter 5 and detects the frame-synchronization signal from the supplied PCM signal, delivering synchronization-detection pulse Syn whenever the frame-synchronization signal is detected. Reference timing generator 8 generates reference timing signals (CKa, CKb, CKc, CKd) in synchronization with synchronization-detection pulse Syn.

Descrambler 9 is supplied with both the PCM signal from difference converter 5 and reference timing signal CKa from reference timing generator 8, and descrambles the PCM signal in synchronization with reference timing signal CKa. Deinterleaver 10 effects a deinterleaving of the output signal of descrambler 9 in synchronization with reference timing signal CKb, thereby reproducing the voice PCM signal.

Error detecting circuit 11 detects a double-error in the output signal of deinterleaver 10 in synchronization with reference timing signal CKc and provides an occurrence pulse E whenever a double-error is detected. Counter 12 counts occurrence pulses E during the period designated by reference timing signal CKd to provide an occurrence number M. The period is long enough to compare the occurrence number with the average occurrence time that two successive double-errors occur. Microcomputer 13 calculates the CN ratio from the occurrence number in accordance with the theoretical relation between the CN ratio and the occurrence number, which will be described in detail below.

In operation, broadcast radio waves is transmitted from a broadcasting satellite at frequencies ranging from 11.7 GHz to 12 GHz in the SHF band. The frequencies of radio waves received by a receiving antenna are down-converted into a frequency range from 1.0 GHz to 1.3 GHz by a first converter. The down-converted signal is then supplied to a satellite broadcast receiver in which its frequency is converted into an intermediate frequency by a second converter. The intermediate-frequency signal is then demodulated by a frequency demodulator to produce a frequency-demodulated signal FD.

Frequency-demodulated signal FD is applied through variable resistor 1 to wide-band amplifier 2. Wide-band amplifier 2 supplies an output signal FO to a transmission line through impedance converter 21, as frequency-domodulated signal OF. Wide-band amplifier 2 also supplies its output to BPF 3 which passes an QPSK voice subcarrier. The QPSK signal is then demodulated by QPSK demodulator 4 into orthogonal component signal Q and coherent component signal I. Orthogonal component signal Q and coherent component signal I are supplied to difference converter 5 to reproduce a PCM signal of 2.048 MBPS.

The reproduced PCM signal is transmitted through three routes. A first transmission route includes buffer amplifier 6 which delivers the PCM signal as digital data or bit stream BST. The reproduced PCM signal is also transmitted through a second transmission route including frame synchronization detector 7 and reference timing generator 8, wherein the start position of a frame made up of 2048 bits is detected by a 16-bit frame-synchronization-pattern extractor (not shown) provided in frame synchronization detector 7. The output of the extractor is supplied to reference timing generator 8 to cause reference timing signals CKa through CKd to be generated. Reference timing signals CKa, CKb, CKc, CKd provide reference timings for signal processing in a third transmission route.

Usually, the PCM signal is transmitted in the NRZ format, and thus possibly continues in the state logic 1 or logic 0 for a long time. Such a continued state, however, is likely to cause it to be impossible to regenerate time information from the PCM signal. In order to avoid such an undesirable situation, the original PCM signal is subject to a scrambling process in which, to the PCM signal, data in the PN pattern made up of pseudo random numbers belonging to the 10th-order M-sequence are added. The original PCM signal is further subject to a bit-interleaving process in order to prevent a burst error.

In the third transmission route, the PCM signal delivered from difference converter 5, which has been scrambled, is descrambled by descrambler 9 in synchronization with reference timing signal CKa, as described above. The descrambled voice PCM signal is deinterleaved by deinterleaver 10 in synchronization with reference timing signal CKb in order to remove the bit-interleave. Voice PCM signal PPC, after thus being processed, undergoes both single-error correction and error control through a double-error detecting code. Error detector 11, supplied with voice PCM signal PPC, detects each occurrence of a double-error in synchronization with reference timing signal Kc. Counter 12 counts occurrence pulses E during the counting period designate by reference timing signal Kd in order to provide occurrence number M. Occurrence number M is supplied to microcomputer 13 which computes the CN ratio from both occurrence number M and the theoretical relation between the CN ratio and occurrence number M. The CN ratio is delivered to a display.

The theoretical relation is derived as described below.

QPSK signal S of a unit amplitude is expressed by $$S(t) = \cos(2\pi f_c t - k_i \pi/2), \quad (1)$$

where $f_c$ stands for a carrier frequency and $k_i = 0, 1, 2$ or 3 corresponding to dibits (00), (01), (11) or (10), respectively, of a modulating PCM signal. Transforming equation (1) into a linear combination of coherent and orthogonal components gives $$S(t) = \cos(k_i\pi/2)\cos 2\pi f_c t + \sin(k_i\pi/2)\sin 2\pi f_c t \quad (2)$$

Signal S(t) above can be represented intuitively as a vector $(\cos(k_i\pi/2), \sin(k_i\pi/2))$ in a two-dimensional vector space defined by two orthogonal basis vectors corresponding to $\cos 2\pi f_c t$ and $\sin 2\pi f_c t$. This vector space is commonly referred to as a signal space. QPSK signal S(t)s modulated (or phase-shift keyed) by PCM dibits (00), (01), (11), (10) and the corresponding coordinates in the signal space are listed in Table 1.

TABLE 1

| $k_i$ | dibit | S(t) | coordinate |
|---|---|---|---|
| 0 | (0 0) | $\cos(2\pi f_c t)$ | (1, 0) |
| 1 | (0 1) | $\sin(2\pi f_c t)$ | (0, 1) |
| 2 | (1 1) | $-\cos(2\pi f_c t)$ | (−1, 0) |
| 3 | (1 0) | $-\sin(2\pi f_c t)$ | (0, −1) |

The noise of carrier frequency $f_c$ is also represented by a linear combination of coherent and orthogonal components, $$N(t) = n_c(t)\cos 2\pi f_c t + n_s(t)\sin 2\pi f_c t, \quad (3)$$

which is received together with QPSK signal S(t) by the CN ratio detecting circuit and causes input signal R(t) of the CN ratio detecting circuit to be randomly fluctuated. The input signal is represented by $$R(t) = \{\cos(k_i\pi/2) + n_c(t)\}\cos 2\pi f_c t + \{\sin(k_i\pi/2) + n_s(t)\}\sin 2\pi f_c t \quad (4)$$

Signals R(t) corresponding to the PCM dibits and their coordinates in the signal space are also listed in Table 2.

TABLE 2

| ki | dibit | R(t) | coordinate |
|---|---|---|---|
| 0 | (0 0) | $(1 + n_c)\cos 2\pi f_c t + n_s \sin 2\pi f_c t$ | $(1 + n_c, n_s)$ |
| 1 | (0 1) | $n_c \cos 2\pi f_c t + (1 + n_s)\sin 2\pi f_c t$ | $(n_c, 1 + n_s)$ |
| 2 | (1 1) | $(-1 + n_c)\cos 2\pi f_c t + n_s \sin 2\pi f_c t$ | $(-1 + n_c, n_s)$ |
| 3 | (1 0) | $n_c \cos 2\pi f_c t + (-1 + n_s)\sin 2\pi f_c t$ | $(n_c, -1 + n_s)$ |

It is assumed that the values of signal R(t) fluctuating with respect to the value of signal S(t) distribute in accordance with the normal distribution. This assumption means in the scheme of the signal space concept that coordinates of signal R(t) distribute around the coordinate of QPSK signal $(\cos(k_i\pi/2), \sin(k_i\pi/2))$ at a density defined by the probability density function, $$P(x, y | x_0, y_0, \pi) = (2\pi\sigma^2)^{-1}\exp[-\{(x-x_0)^2 + (y-y_0)^2\}/(2\sigma^2)] \quad (5)$$

wherein $\sigma$ stands for the mean square error, and a set of constants $(x_0, y_0)$ and a set of variables $(x, y)$ represent the coordinate of signal S(t) as shown in Table 1 and the coordinate of signal R(t) as shown in Table 2, respectively. More specifically, the probability density function for each PCM dibit becomes as follows: For dibit (0 0), $$\begin{aligned} P_0 &= P(x, y | 1, 0, \sigma) \\ &= (2\pi\sigma^2)^{-1}\exp[-\{(x-1)^2 + y^2\}/(2\sigma^2)] \end{aligned} \quad (6)$$

and for dibit (1 1), $$\begin{aligned} P_1 &= P(x, y | -1, 0, \sigma) \\ &= (2\pi\sigma^2)^{-1}\exp[-\{(x+1)^2 + y^2\}/(2\sigma^2)]; \end{aligned} \quad (7)$$

for dibit (0 1), $$\begin{aligned} P_2 &= P(x, y | 0, 1, \sigma) \\ &= (2\pi\sigma^2)^{-1}\exp[-\{x^2 + (y-1)^2\}/(2\sigma^2)] \end{aligned} \quad (8)$$

and for dibit (1 0), $$\begin{aligned} P_3 &= P(x, y | 0, -1, \sigma) \\ &= (2\pi\sigma^2)^{-1}\exp[-\{x^2 + (y+1)^2\}/(2\sigma^2)]. \end{aligned} \quad (9)$$

Figure 3:
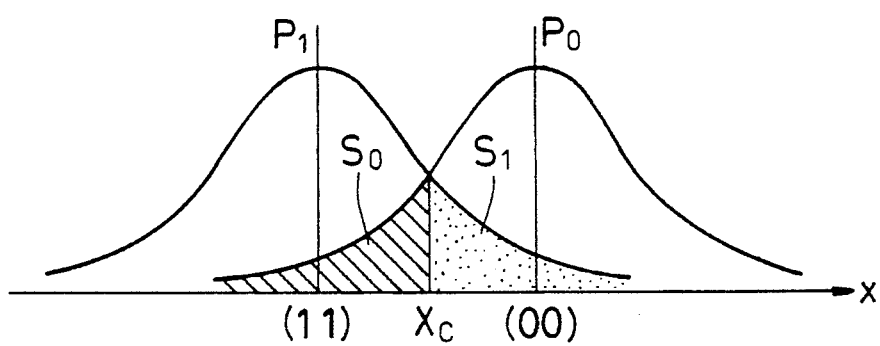
FIG. 3 is a diagram for explaining a mathematical formulation of the double-error rate.

It is to be noted that probability density functions $P_0$, $P_1$ for dibits (0 0) and (1 1) are in mirror image relation with respect to x being equal to 0, i.e., the two probability density functions are interchanged through the mirror image $x \to -x$ as shown in FIG. 3, and that probability density functions for dibits (0 1) and (1 0) (not shown) are also in mirror image relation with respect to y being equal to 0. This means that area $S_0$ enclosed by probability density function curve $P_0$ in region $x < 0$ equals area $S_1$ for $P_1$ in region $x > 0$. Accordingly if criterion point $x_c$ for dibits (0 0), (1 1) is set at coordinate $x = 0$, area $S_0$ is proportional to probability $Pe_0$ in that dibit (0 0) is erroneously detected as (1 1), and area $S_1$ is proportional to probability $Pe_1$ in that dibit (11) is erroneously detected as (0 0), wherein criterion point $x_c$ refers to the x-coordinate above which signal R(t) is judged to carry dibit (0 0) and below which signal R(t) is judged to carry dibit (1 1), regardless of whether QPSK signal S(t) included in signal R(t) actually carries PCM dibit (0 0) or (1 1). Since area $S_0$ is equal to area $S_1$ as described above, $Pe_0 = Pe_1$. Criterion limit $x_c$ which makes $Pe_0$ and $Pe_1$ equal is commonly called the optimum limit. (In the case that criterion limit $x_c$ is set at the optimum limit, the sum of the probability of judging (0 0) as (1 1) and the probability of judging (1 1) as (0 0) is minimal.) Probabilities $Pe_0$ and $Pe_1$ are commonly called the error rate for (0 0) and for (1 1), respectively. The error rate for (0 0) becomes $$\begin{aligned} Pe_0 &= \int_{-\infty}^{0} dx \int_{-\infty}^{\infty} P(x, y | 1, 0, \sigma) \, dy \\ &= (2\pi\sigma^2)^{-\frac{1}{2}} \int_{-\infty}^{0} \exp[-(x-1)^2/(2\sigma^2)] \, dx \\ &= (2\pi)^{-\frac{1}{2}} \int_{-\infty}^{-1/\sigma} \exp(-\xi^2/2) \, d\xi \end{aligned} \quad (10)$$

$$= \Phi(-1/\sigma),$$

where $$\Phi(z) = (2\pi)^{-\frac{1}{2}} \int_{-\infty}^{z} \exp(-\xi^2/2) \, d\xi. \tag{11}$$

On the other hand, the carrier power of the QPSK signal per period is given by $$C = f_c \int_{-1/(2f_c)}^{1/(2f_c)} 2^{-1} S^2(t) \, dt \tag{12}$$

$$= f_c \int_{-1/(2f_c)}^{1/(2f_c)} 2^{-1} \cos(2\pi f_c t + k_i \pi/2) \, dt$$

$$= 4^{-1}.$$

Similarly the noise power per period is given by $$P_N = f_c \int_{-(f_c/2)}^{(f_c/2)} 2^{-1} N^2(t) \, dt \tag{13}$$

$$= 4^{-1} (n_c^2 + n_s^2)$$

$$= 4^{-1} n^2.$$

It is assumed that the noise is superposed isotropically on QPSK signal S(t); in other words, vector $n(n_c, n_s)$ representing noise N distributes in the signal space isotropically around vector $(\cos k_i \pi/2, \sin k_i \pi/2)$ for QPSK signal S. This involves the fact that the probability density function is represented in terms of same variance $\sigma^2$ for any of $n_c$, $n_s$ and n. Thus, the average value of $n^2$ is given by $$E(n) = \sigma^2 \tag{14}$$

and $$N_p = 4^{-1} \sigma^2, \tag{15}$$

wherein $$E(n) = (2\pi\sigma^2)^{-\frac{1}{2}} \int_{-\infty}^{\infty} n^2 \exp[-n^2/(2\sigma^2)] \, dn, \tag{16}$$

and $N_p$ denotes the averaged noise power derived by assuming that one-period noise power $P_N$ distributes in accordance with the normal distribution. The theoretical CN ratio, accordingly, is given, from equations (12) and (15), by $$C/N_p = \sigma^2. \tag{17}$$

It follows from equation (10) that $$P_{e_0} = \Phi\{-(C/N_p)^{-\frac{1}{2}}\}. \tag{18}$$

Theoretically, error rate $P_{e_0}$ is proportional to the means of the occurrence number counted for an infinitely long time. Experimentally, however, it is measured by counting the occurrence number M throughout a time period which is long enough to compare with the average occurrence time as described above. Thus, it results that $$M = k\Phi(-\alpha^{-\frac{1}{2}}), \tag{19}$$

wherein k and $\alpha$ denote the proportional constant and the CN ratio, respectively. Proportional constant k can be experimentally determined.

Figure 4:
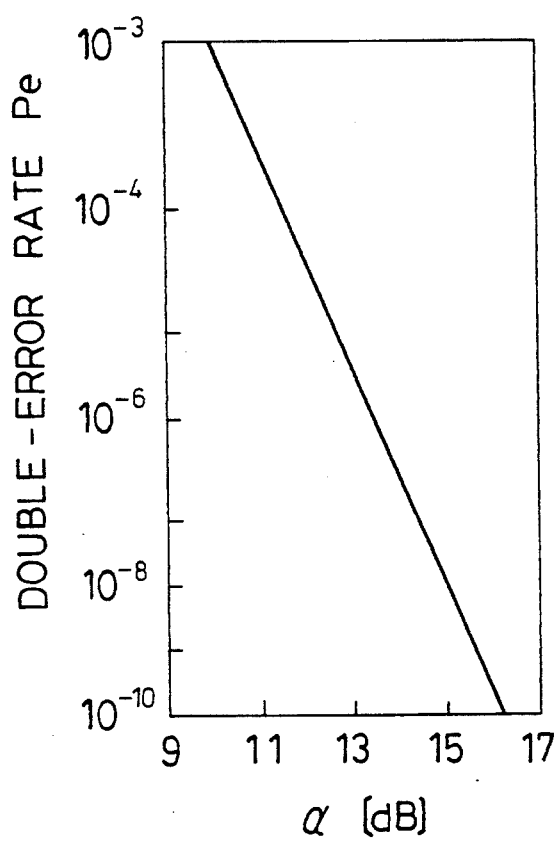
FIG. 4 shows a curve of double-error rates plotted against CN ratios.

The same argument holds in double-error rates $P_{e_1}$, $P_{e_2}$, $P_{e_3}$ for dibits (1 1), (0 1), (1 0), respectively. Accordingly, the same relation holds between double-error rate Pe and CN ratio $\alpha$ for any of the PCM dibits. The curve of double-error rate Pe plotted against CN ratio $\alpha$ is represented in the logarithmic scale in FIG. 4. Thus, by storing a conversion table corresponding to equation (19) or FIG. 4 in a memory provided in microcomputer 13, CN ratio o can be obtained from double-error rate Pe determined by occurrence number M for a given counting period.

The use of a double-error detecting counter and a microcomputer for computing the CN ratio from the theoretical relation between CN ratios and double-error rates makes it unnecessary to use the noise amplifier and noise detector as in the CN ratio detecting circuit of the prior art. By virtue of the absence of errors caused by dispersions in the gain and the SN ratio and also caused by the temperature variation and the non-linear deformation, the present invention has the advantage that it is capable of obtaining a high-precesion CN ratio without any special adjustment. The present invention has another advantage in that, since it is not necessary to use expensive parts such as an A-D converter or the like, the cost can be reduced.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of determining the carrier-to-noise ratio of a quaternary phase-shift keying ("QPSK") signal which includes a binary signal representing at least a message and an information for error-control in order to detect a double-error, said method comprising the steps of:

receiving said QPSK signal and reproducing said binary signal from said QPSK signal, detecting said double-error included in said binary signal and generating an occurrence pulse in response to a detection of said double-error, counting said occurrence pulses and providing an occurrence number of said double-errors over a predetermined time period which is long enough to compare said occurrence number with an average occurrence time to indicate that successive double-errors have occurred, and computing said carrier-to-noise ratio from said occurrence number in accordance with a theoretical relation between carrier-to-noise ratios and occurrence numbers of said double-errors.

2. A method as claimed in claim 1, wherein said theoretical relation is expressed by the equation $$M = k\Phi(-\alpha^{-\frac{1}{2}}),$$

where: α and M denote said carrier-to-noise ratio and said occurrence number of said double-error, respectively, k being a proportional constant and function Φ being defined so that $$\Phi(z) = (2\pi)^{-\frac{1}{2}} \int_{-\infty}^{z} \exp\left(-\frac{\zeta^2}{2}\right) d\zeta$$

where" ζ=a variable of integration having the dimension of $\alpha^{-\frac{1}{2}}$.

3. A circuit for detecting the carrier-to-noise ratio of a quaternary phase shift keying ("QPSK") signal which includes a binary signal representing at least a message and an information for error-control in order to detect a double-error, said circuit comprising
 converter means which receives said QPSK signal and reproduces said binary signal from said QPSK signal,
 error-control means which at least detects said double-error included in said binary signal, and which delivers an occurrence pulse in response to a detection of said double-error,
 counter means which counts said occurrence pulses and provides an occurrence number of said double-errors during a predetermined time period which is long enough to compare said occurrence number with an average occurrence time to indicate that successive double-errors have occurred, and
 computer means which computes said carrier-to-noise ration from said occurrence number in accordance with a theoretical relation between carrier-to-noise ratios and occurrence numbers of said double-errors.

4. A circuit as claimed in claim 3, wherein the theoretical relation is expressed by the equation $$M = k\Phi(-\alpha^{-\frac{1}{2}}),$$

where: α and M denote said carrier-to-noise ratio and the occurrence number of the double-error, respectively, k being a proportional constant and function Φ being defined so that $$\Phi(z) = (2\pi)^{-\frac{1}{2}} \int_{-\infty}^{z} \exp\left(-\frac{\zeta^2}{2}\right) d\zeta$$

where: ζ=a variable of integration having a dimension of $\alpha^{-\frac{1}{2}}$ and the computer means has a memory storing a conversation table corresponding to the equation $M = K\Phi(-\alpha^{-\frac{1}{2}})$.

5. A circuit as claimed in claim 4, said circuit further including
 frame-synchronization detecting means which detects a frame-synchronization signal included in said binary signal and delivers a synchronization-detection pulse in response to said frame-synchronization detecting means detecting said frame-synchronization signal, and
 timing generating means which generates at least two timing signals in synchronization with said synchronization-detection pulse, a first of said timing signals being supplied to said error control means to designate an error detecting timing and a second of said timing signals being supplied to said counter means to designate said predetermined time period.

6. A circuit as claimed in claim 5, wherein said converter means includes QPSK demodulator means and difference converter means, said QPSK demodulator means performing synchronous-detection of said QPSK signal to provide coherent and orthogonal outputs and said difference converter means generating said binary signals from said outputs of said QPSK demodulator means.

7. A circuit as claimed in claim 6, wherein said QPSK signal is a voice subcarrier component in a satellite broadcast signal, and said binary signal includes voice pulse code modulation which forms said message.

8. A circuit as claimed in claim 3, said circuit further including
 frame-synchronization detecting means which detects a frame-synchronization signal included in said binary signal and delivers a synchronization-detection pulse in response to said frame-synchronization detecting means detecting said frame-synchronization signal, and
 timing generating means which generates at least two timing signals in synchronization with said synchronization-detection pulse, a first of said timing signals being supplied to said error-control means to designate the error detecting timing and a second of said timing signals being supplied to said counter means to designate said predetermined time period.

* * * * *